United States Patent [19]

Günther et al.

[11] 4,375,857
[45] Mar. 8, 1983

[54] AUTOMATIC RAILWAY CONTROLLED BUFFER COUPLING

[76] Inventors: Wilhelm Günther, Rilkeweg 6; Hilmar Forster, Grüner Platz 26 b, both of, 3340 Wolfenbüttel, Fed. Rep. of Germany

[21] Appl. No.: 157,550

[22] Filed: Jun. 9, 1980

[30] Foreign Application Priority Data

Jun. 29, 1979 [DE] Fed. Rep. of Germany ....... 2926301

[51] Int. Cl.³ .......................... B61G 1/32; B61G 3/16; B61G 7/06
[52] U.S. Cl. ........................................ 213/77; 213/78; 213/220; 285/25; 285/28; 403/361
[58] Field of Search ........... 213/1 R, 75 R, 77, 100 R, 213/150, 220, 78, 88, 93, 94, 96, 98, 175, 176, 182, 187; 285/24, 25, 26, 27, 28, 29; 403/361

[56] References Cited

U.S. PATENT DOCUMENTS

| 83,907 | 11/1868 | Blackstone | 213/220 |
| 340,206 | 4/1868 | Furrell | 213/220 |
| 895,274 | 8/1908 | Kelly et al. | 285/28 |
| 1,245,791 | 11/1917 | Robinson | 285/24 |
| 1,430,659 | 10/1922 | Larsson | 213/220 |
| 1,670,987 | 5/1928 | Robinson | 285/28 |
| 1,933,145 | 10/1933 | Larsson | 213/150 |
| 2,161,724 | 6/1939 | Scharfenberg | 213/77 |

FOREIGN PATENT DOCUMENTS

| 1126981 | 12/1956 | France | 213/96 |
| 159305 | 6/1957 | Sweden | 213/88 |

Primary Examiner—Robert B. Reeves
Assistant Examiner—Howard Beltran
Attorney, Agent, or Firm—McGlew and Tuttle

[57] ABSTRACT

An improved automatic central buffer coupling for rail vehicles includes a cone formed with a tip portion on the end of the cone having a convex surface and a funnel-shaped member for receiving the cone member of an opposite coupling which is formed with an inwardly inclined chamfer at the inlet opening thereof.

7 Claims, 3 Drawing Figures

ND BACKGROUND OF THE INVENTION

AUTOMATIC RAILWAY CONTROLLED BUFFER COUPLING

FIELD AND BACKGROUND OF THE INVENTION

The invention relates to an automatic central buffer coupling plate for vehicles, particularly railroad vehicles, comprising a cone projecting from the impact surface, and a funnel for receiving the cone of an opposite coupling plate, with the funnel and the cone being uniformly spaced from the vertical median plane passing through the housing of a coupling head, and having a circular surface.

In known coupling plates of this kind, a surface is provided on the inside of the cone giving the coupling plate a lateral range of engagement in one direction, so that if the couplings having these plates are laterally offset during the coupling operation, the misalignment is corrected by the funnel. At the funnel side, a guide horn is provided on the impact surface, serving the purpose of laterally aligning the couplings in the other direction and of aligning the coupling in height. This guide horn projects from the impact surface like a spear so that, for reasons of safety, it is no longer permissible in couplings intended for street cars.

The invention is directed to a specific design of the funnel and the cone providing a range of engagement corresponding in height and laterally at least to that of the prior art.

In accordance with the invention, this problem is solved by providing that the surface on the inside of the cone terminates at the tip of the cone in a convex portion and that the funnel is designed with an inwardly inclined chamfer which, as viewed in a top plan view, has the configuration of a square whose sides are tangent to the funnel.

BRIEF DESCRIPTION OF THE DRAWING

One embodiment of the invention is diagrammatically shown in the drawings in which.

DETAILED DESCRIPTION OF THE PREFERRED EMBODIMENT

Figure 1:
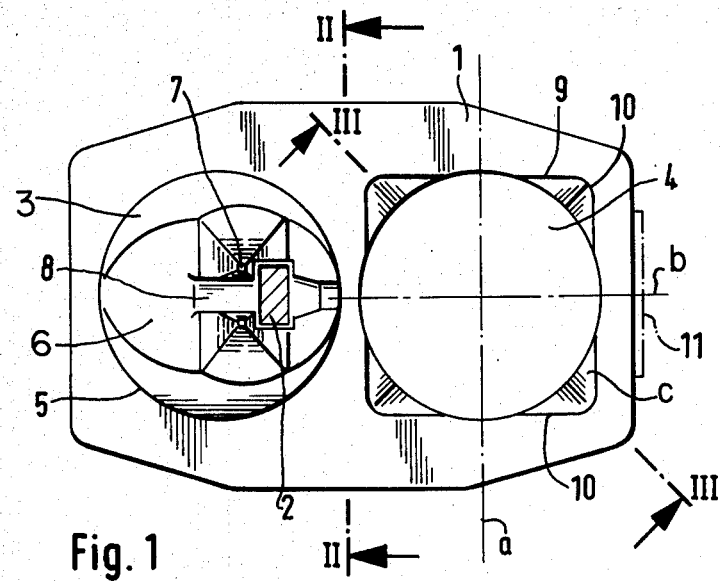
FIG. 1 is a front elevation view of the front plate of a central buffer coupling plate.
Figure 2:
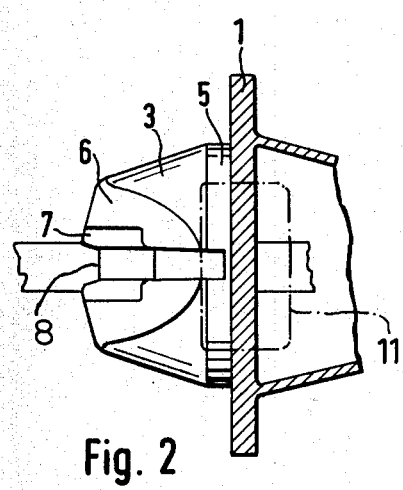
FIG. 2 is a side view, partly in section, of the plate of FIG. 1 taken along the line II—II of FIG. 1.
Figure 3:
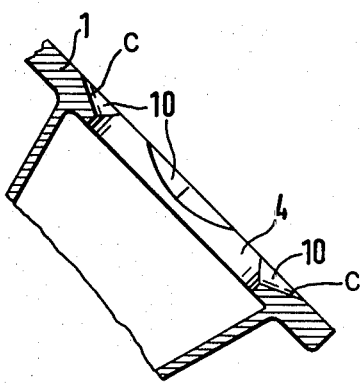
FIG. 3 is a partial sectional view taken along line III—III of FIG. 1.

As shown in the figures, the invention comprises a central buffer coupling plate which can be used in rail vehicles, the plate having a side defining a vertical impact surface 1 which comes into contact with a vertical impact surface of a central buffer coupling plate of an opposite coupling member (not shown).

In a known manner, the impact surface 1 carries a cone 3 in which the coupling eye 2 of a known parallelogram lock is received, and is provided, at an equal distance from the vertical median plane a of the central buffer coupling plate, with a funnel 4 for receiving the cone of the opposite coupling (not shown). Cone 3 is connected to impact surface 1 through a circumferential circular wall 5 to which the cone proper 3 is joined. The inside of cone 3 is designed as a frontally flaring guide surface 6 which terminates, on both sides of the recess 8 for coupling eye 2, in an abutting edge 7 forming, with the outside surface of the cone a convex portion for receiving the coupling eye 2 of an opposite coupling. While the wall is arcuate, as viewed in a top plan view, cone 3 has an approximately oval configuration in cross-section, with the section extending in the horizontal median plane.

The cross-section of funnel 4 corresponds to the outer surface of wall 5, so that in a coupled state, cone 3 of the opposite coupling (not shown) is received in the funnel without play. Symmetrically to the horizontal b and vertical a median planes through funnel 4, a chamfer 10 inclined toward funnel 4 is provided, which has a square configuration as shown in FIG. 1, with the sides 9 being substantially tangent to funnel 4, so that the cross-section of the chamfer is largest along a diagonal, line between the corners of the square.

Due to the sloping guide faces c of the chamfer 10, in connection with the oval configuration of cone 3 and the convex portion 3, at the tip of the surface 6 on the inside of the cone 3 a misalignment can now be limited in height and lateral position, corresponding to the chamfer square during a coupling operation. With vehicles where a particularly great lateral misalignment in one direction is expected, a guid strip 11 may be provided on one edge of the plate, slightly projecting beyond impact surface about at the level of wall 5.

While a specific embodiment of the invention has been shown and described in detail to illustrate the application of the princippples of the invention, it will be understood that the invention may be embodied otherwise without departing from such principles.

We claim:

1. An improved automatic central buffer coupling plate for rail vehicles of the type having a side defining a vertical planar impact surface (1), a cone (3) projecting from and having a base adjacent the impact surface, and a funnel-shaped member (4) extending from a side of the plate opposite the impact surface, the funnel-shaped member and cone being uniformly spaced from a vertical median plane passing through the plate, the funnel-shaped member having a circular opening at the impact surface of a diameter about equal to that of the cone base for receiving a cone of an opposite coupling plate, comprising, in combination, the improvement wherein the cone is formed with a tip portion (7) on an end of the cone having a convex shape, and the funnel-shaped member is formed with an inwardly inclined chamfer (10) at the circular opening, having on the impact surface, the configuration of a square with sides (9) tangent to the circular opening.

2. An improved automatic central buffer coupling plate as set forth in claim 1, wherein the cone has an inner recess (8) for receiving a coupling eye 2, and said tip portion 7 is formed with an edge abutting opposite sides of said recess.

3. An improved automatic central buffer coupling plate as set forth in claim 1 further comprising a guide strip (11) connected to one edge of the plate slightly projecting beyond the impact surface.

4. An improved central buffer coupling plate as set forth in claim 1 wherein the cone is formed with an oval shaped cross-section with a major axis in the horizontal median plane of the plate and wherein a circular wall portion 5 connects the cone base to the impact surface.

5. An improved automatic central buffer coupling plate as set forth in claim 4, wherein the cone has an inner recess (8) for receiving a coupling eye (2), and said tip portion (7) is formed with an edge abutting opposite sides of said recess.

6. An improved automatic central buffer coupling plate as set forth in claim 1, wherein said cone includes a frontally flaring guide surface (6) terminating at the tip portion (7).

7. An improved automatic central buffer coupling plate as set forth in claim 6, including a recess (8) extending in a horizontal median plane of the plate, said tip portion (7) positioned above and below said recess.

* * * * *